INVENTORS
ERNST WIELAND
ALBERT DIETRICH

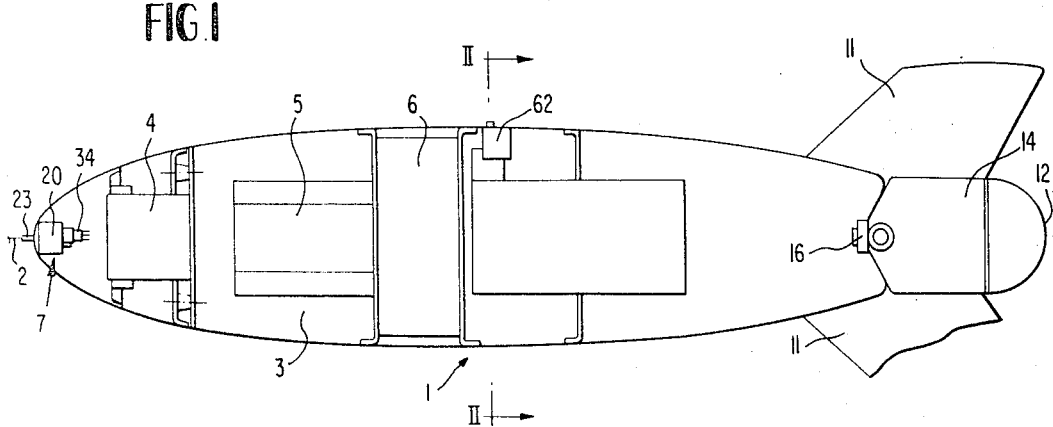
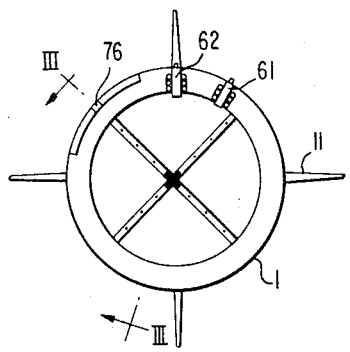
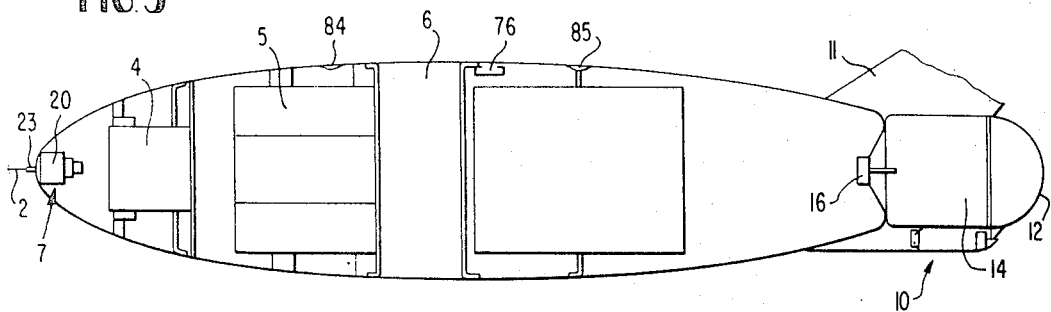

June 24, 1969  E. WIELAND ETAL  3,451,642
RECOVERY SYSTEM FOR TOWED AIRCRAFT
Filed March 22, 1967  Sheet 3 of 3
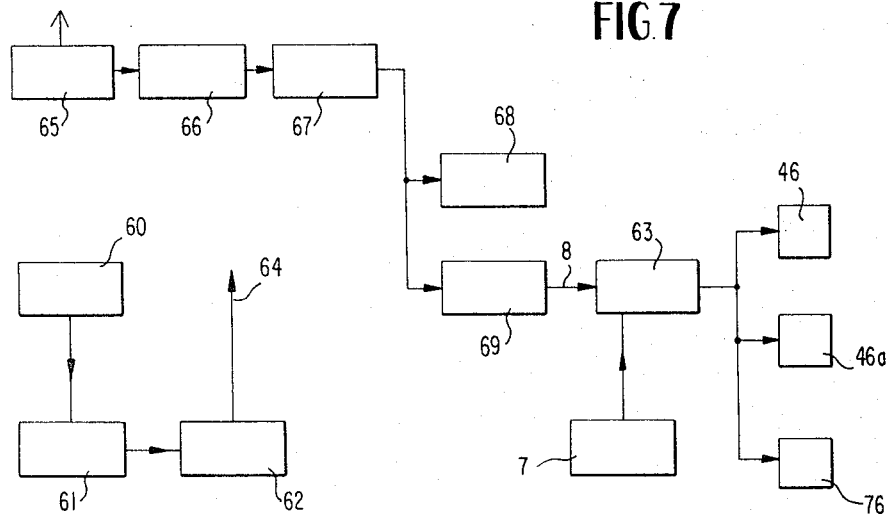
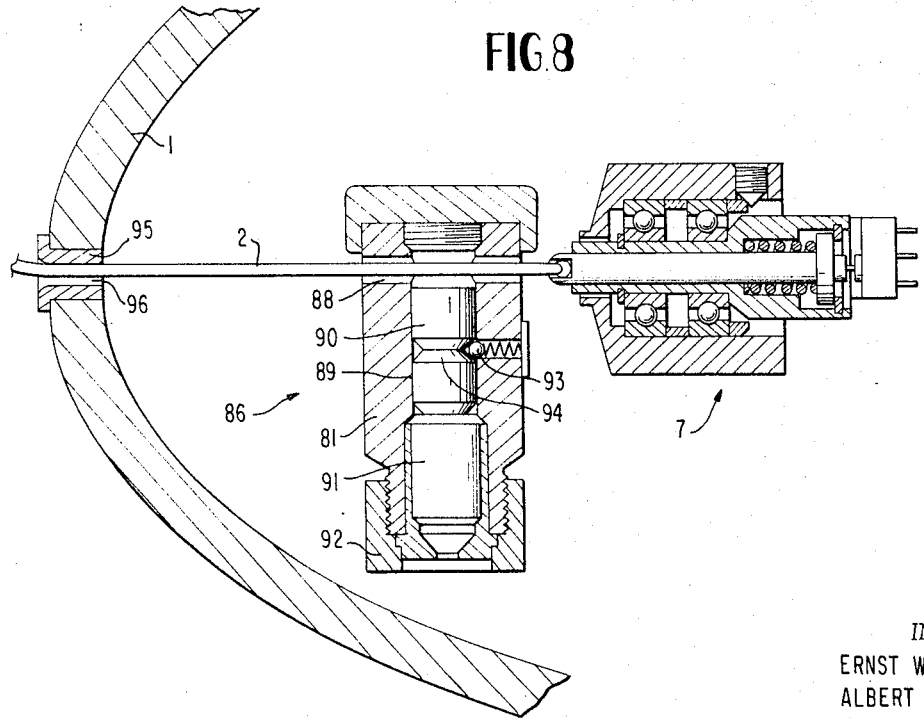
INVENTORS
ERNST WIELAND
ALBERT DIETRICH
BY James E. Bryan
ATTORNEY United States Patent Office 3,451,642
Patented June 24, 1969

3,451,642
RECOVERY SYSTEM FOR TOWED AIRCRAFT
Ernst Wieland, Langenargen, and Albert Dietrich, Markdorf, Germany, assignors to Dornier System G.m.b.H., Friedrichshafen, Germany, a limited-liability corporation of Germany
Filed Mar. 22, 1967, Ser. No. 625,229
Claims priority, application Germany, Apr. 19, 1966, D 49,882
Int. Cl. B64d *3/00, 17/00*
U.S. Cl. 244—3
8 Claims

ABSTRACT OF THE DISCLOSURE

This invention relates to a recovery system for use with towed aircraft, such as those employed as aerial targets, which prevents destruction of the towed aircraft, and also of impact indicating instruments, radio control signal receivers, and the like carried by the towed aircraft, by crashing of the aircraft on the surface of the earth when the towed aircraft is unintentionally separated from a towing aircraft. The towed aircraft includes an extendible recovery device and a releasing means which automatically effects the release of the recovery device in dependence upon the amount of tension in the tow line.

It is already known to retract towed aircraft of the type employed in the present invention by means of a cable winch mounted in the towing aircraft and to secure such retracted towed aircraft to the towing plane. Such winches, however, are expensive, add additional weight to the towing plane, and require considerable space therein. It is known to separate towed aircraft from towing aircraft by means of radio signals transmitted from a ground station to a receiver and releasing mechanism within the towed aircraft, in which case the towed aircraft must be considered expendable.

If such towed aircraft are employed, for example as towed targets for gunnery practice, a number of valuable and expensive instruments for evaluation of the accuracy of firing must be accommodated in the towed aircraft and, in accordance with the known methods, these instruments are destroyed with the aircraft when it crashes on the ground.

It also has been proposed to accommodate a recovery device, such as a parachute, in the towed aircraft, the release of which parachute is effected by means of radio signals received from a ground station by receivers mounted in the towed aircraft. This method, however, involves the disadvantage that if the towed aircraft travels beyond the range of the transmitting station on the ground, the release of the recovery system, for example in case of disconnection of the tow line, is no longer possible, and the towed aircraft, together with the expensive instruments contained therein, will be destroyed in this case also.

In the recovery system of the present invention, the tow line is connected to the towed aircraft through a releasing mechanism and a locking device for the recovery means is actuated by the releasing mechanism.

By virtue of the recovery system constructed in accordance with the present invention, release of the recovery device is automatically effected in case of unintentional separation of the towed aircraft from the towing aircraft, and this will occur even if the towed aircraft should happen to travel beyond the range of a transmitting station on the ground.

The system operates in a safe and simple manner and requires only a limited amount of space both within the towing aircraft and the towed aircraft. In addition, the recovery system has the advantage of extremely low weight and may be installed in existing towed aircraft and towing aircraft.

Figure 4:
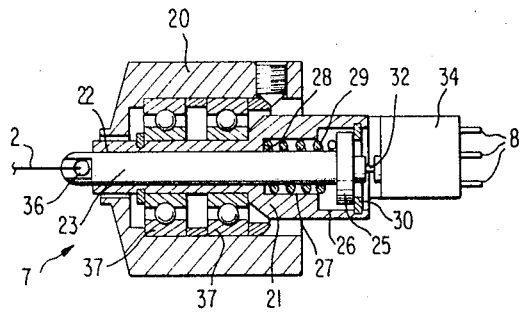
Figure 5:
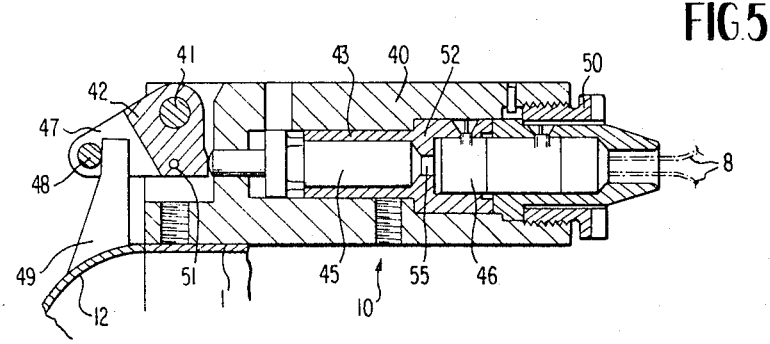
Figure 6:
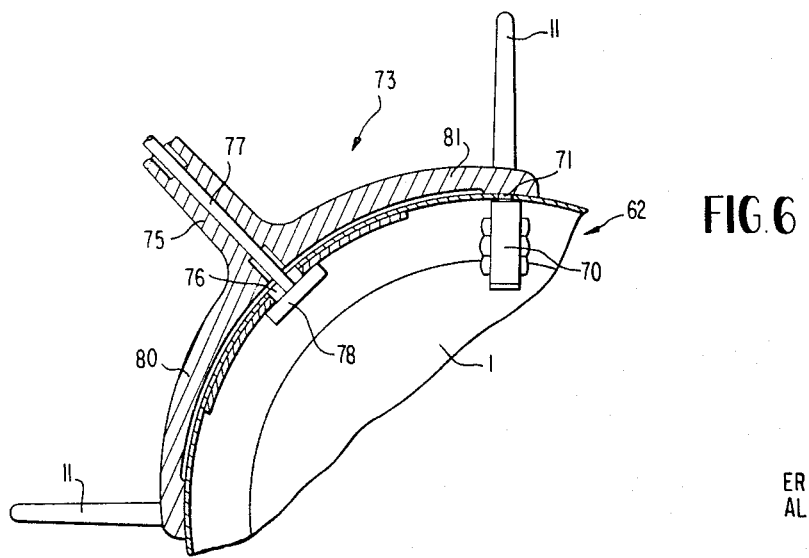

One embodiment of the invention is illustrated in the accompanying drawings in which:

FIGURE 1 is a view in elevation, partially in longitudinal section, of the entire towed aircraft, FIGURE 2 is a sectional view of the towed aircraft taken on line II—II of FIGURE 1, FIGURE 3 illustrates the locking mechanism for the recovering means, in a view taken on line III—III of FIGURE 2, FIGURE 4 is a view, in longitudinal cross-section, of the releasing mechanism at an enlarged scale with respect to FIGURES 1 and 3, FIGURE 5 is a view, in longitudinal cross-section, of the locking mechanism at an enlarged scale with respect to FIGURE 3, FIGURE 6 shows the mounting support for the towed aircraft, at an enlarged scale as compared to FIGURE 2, FIGURE 7 is a schematic view of the electrical system employed, and FIGURE 8 is a view, in longitudinal cross-section, of a portion of the towed aircraft showing a cutting device for the tow line.

The recovery system, as illustrated in FIGURES 1 to 6, is adapted for installation into a towed aircraft of known construction, which aircraft is towed by means of a tow line, such as a cable or rope 2, and is unmanned. The towed aircraft may be towed by a manned or unmanned towing aircraft, not shown in the drawings. Towed aircraft of the type employed in the present invention serve primarily as aerial targets and contain hit-evaluating instruments together with a telemetric transmitter or the like.

Reference numeral 3 identifies the interior space of the towed aircraft 1 which interior space is divided into several chambers for accommodating a signal receiver 4, a telemetric transmitter 5 and a hit-indicating instrument 6, as well as other instruments required for evaluating firing results. Positioned at the nose of the towed aircraft 1 is a releasing switch 7 which establishes the connection between the tow line 2 and the towed aircraft 1 and which is responsive to the tension in the tow line. A locking mechanism 10, shown in FIGURE 3, is in operative connection with the releasing switch 7, by means of electrical transmission elements shown in FIGURE 7, and is mounted at the tail of the towed aircraft 1, which is provided with the tail fins 11. The tail of the towed aircraft 1 contains a chamber 14 which is closed at the rear thereof by means of a detachable closure member 12 and serves for receiving a recovery parachute. The closure member 12 is retained, by means of the locking mechanism 10, in a position closing the space or chamber 14. Also mounted in the towed aircraft within the space 14 is an attachment means 16 to which the parachute, not shown, is connected.

As shown in FIGURE 4, the releasing switch 7 includes a housing 20 which is secured to the hull of the towed aircraft 1 and receives a guide sleeve or bushing 21 therein, the latter having a central axial bore 22 in which a setting or adjusting bolt 23 is axially movably positioned. The portion of the bolt 23 which is positioned within the sleeve or bushing 21 is provided with a collar 25, accommodated in an expanded portion 26 of the bore 22. Mounted between the collar 25 of the bolt 23 and the shoulder 28, formed by a wide portion 27 of the bore 22, is a helical compression spring 29 by means of which the bolt 23, in the position of rest thereof, is maintained in bearing contact with a spring or snap ring 30 which is inserted in the bore of the bushing 21. The end of the setting or adjusting bolt coacts with a switching member 32 of an electric control switch 34 which, by means of the cables 8, is connected to the locking mechanism 10, shown in FIGURE 5. Provided at the free end of the setting or adjusting bolt 23, projecting from the housing 20 and through the nose of the towed aircraft, is the connection 36 for the tow line 2. As is apparent from FIGURE 4, the bushing 21, together with the adjusting bolt 23, is mounted in the housing 20 on ball bearings 37 in order to prevent twisting of the tow line 2 when towed aircraft are employed which are intended to execute a rotary movement about the longitudinal axis thereof.

As shown in FIGURE 5, the locking mechanism 10 includes a housing 40, which is secured at the rear end of the towed aircraft 1, a locking lever 42 pivotal on the housing about a bolt or stud 41, a firing pin 45 which is axially displaceable within a bore 43 in the housing 40, and an explosive charge 46 positioned in the bore 43 coaxially with respect to the firing pin. The locking lever 42 includes a bifurcated arm 47 through which extends a locking or check bolt 48, this latter bolt retaining the securing arm 49 which is attached to the closure member 12 and is shown in FIGURE 5 in the neutral position of the lever 42. The locking lever 42 is retained in the neutral position thereof by means of a shear pin 51 which is mounted on the housing 40. The firing pin 45 is guided in a sleeve or bushing 52 which is inserted into the bore in the housing and retained in the latter by means of a threaded closure member 50. The free end of the firing pin 45 projects out of the housing 40 and abuts against the locking lever 42 at the height of the shear pin 51. At the opposite end thereof, the firing pin 45 is positioned, in the bushing 52, within the explosive chamber 55 which contains the explosive charge 46 and is sealed off, forming a closed chamber. Positioned adjacent the explosive charge 46 are the ignition cables 8 connected to the releasing switch 7.

As is apparent from FIGURE 7, the electrical system for the ignition of the explosive charge 46 contains the batteries 60, which constitute the current or power supply to the line 64 through a key-operated switch 61 and a releasing switch 62. Interposed between the explosive charge 46 and the batteries 60 is an electrically operated delay member 63 of known construction which is employed in order to avoid unintentional release of the recovery parachute, for example in cases where oscillation of the towed aircraft 1 might occur without separation of the tow line 2. An additional explosive charge 46a may be included for the purpose of ensuring release of the recovery parachute and, in addition thereto, a release of the parachute, effected by radio waves, additionally may be provided. For this purpose, an antenna matching unit 65, an input filter 66 and a receiver 67 with, for example, two channel stages 68 and 69, are included in the towed aircraft according to the circuit shown in FIGURE 7.

The pressure-operated switch, identified by reference numeral 62 in FIGURE 7, is illustrated in further detail in FIGURE 6. The pressure-operated switch 62 consists of a switch portion 70 which is mounted on the towed aircraft 1 and which contains a displaceable switching member or contact assembly 71 for connection of the current supply line 64 with the delay member 63 and the explosive charges 46 and 46a. The actuation of the switching member or contact assembly 71 is effected by means of the mounting support 73 secured to the towing aircraft, not shown. The mounting support is formed by a supporting arm 75 and displaceable releasing means extending through the latter. These releasing means may consist of a rotatable bar or rod 77 with a locking plate 78 in which case the locking plate passes through an opening 76 in the hull of the towed aircraft 1 and, by rotation of the rod 77, the locking plate may be so positioned that the towed aircraft 1 is locked to the towing aircraft by means of the supporting arm 75. The supporting arm 75 includes the web portions 80 and 81, respectively, which enclose a portion of the hull of the towed aircraft 1 and extend in the direction of the longitudinal axis of the towed aircraft. Within the area of the outer part of the web portion 81, the pressure-operated switch 62 is positioned in the towed aircraft 1 and the switching member 71 may be actuated by means of the web portion 81. For purposes of centering the towed aircraft at the supporting arm 73, recesses 84 and 85, respectively, are provided, as shown in FIGURE 3, in the towed aircraft and are positioned in tandem with respect to each other in the direction of the longitudinal axis of the towed aircraft. Corresponding projections, not shown, in the supporting arm 73 engage in the recesses 84 and 85.

The operation of the recovery system is as follows: Prior to take-off of the towing aircraft, the towed aircraft 1 is locked to the mounting support 73 on the towing aircraft and the switching element 71 of the pressure-operated switch 62 is thereby displaced so that the current supply 64 for the receiver 67 and the ignition of the explosive charges 46 is interrupted, thereby conserving electric current. Immediately prior to take-off of the towing aircraft, the key-operated switch 61 is closed; it is employed to interrupt the current supply during the positioning of the towed aircraft on the towing aircraft. After take-off of the towing aircraft and once the intended area of operations has been reached, the towed aircraft is unlocked from the mounting support 73 of the towing aircraft by rotating the locking plate 78, either by remote control means, not shown, or adjustable time relays, whereby the connection between the towing aircraft and the towed aircraft is broken. In case no winch is provided in the towing aircraft for unreeling the tow line 2 from the drum, as in the present embodiment, the towed aircraft 1 will drop to a lower altitude than the towing aircraft after the releasing operation until the tow line 2 is tightened. By reason of the aerodynamic forces acting upon the towed aircraft 1, the setting or adjusting bolt 23 is displaced with respect to the housing 20 against the action of the pre-stressed compression spring 29 and the collar 25 of the bolt will come to rest against the shoulder portion 28 of the bushing 21. The setting member 32 of the switch 34 is actuated thereby to effect an interruption of the current supply 64 of the receiver 67 and of the ignition device for the explosive charges 46 and 46a. In order to prevent ignition of the explosive charge 46, for release of the recovery parachute, during the brief time interval between the release of the towed aircraft 1 from the mounting support 73 of the towing aircraft and the occurrence of the drag forces at the towed aircraft 1, which effect the tightening of the tow line 2, the electrically-operated delay member 63 is interposed in the ignition cables or lines 8. A delay of about 2 to 4 seconds is sufficient for bridging this time period. If, at that time, the tow line is unintentionally disengaged from the towing aircraft or if the tow line is destroyed, for example by being struck by a projectile, the tow line tension is reduced to zero and the compression spring 29 of the releasing switch 7 effects a displacement of the adjusting bolt 23 thereby actuating the switch 34 and forming a complete circuit to the ignition device of the explosive charge 46 in the locking device 10. After completion of the delay of the current through the delay member 63, the explosive charges 46 and 46a are ignited and the firing bolt 45 is forced against the locking lever 42. The shear pin 51 is sheared off and the lever 42 pivots about the pivot pin or bolt 41 at which time the locking or check bolt 48 will release the supporting arm 49 secured to the closure member 12. The recovery parachute is then pulled out of the chamber 14 by the slipstream and lowers the towed aircraft gently to the ground. The relatively low impact velocity of the towed aircraft ensures that no damage will occur to the instruments housed therein. The instruments may be further protected by mounting them within resilient supports in the towed aircraft or by mounting them in elastically deformable materials.

A release of the recovery parachute also may be effected at any time by means of the receiver 67 which receives radio signals from a transmitting station on the ground. In this case, the igniting impulse is supplied from the receiver 67 through a corresponding channel 68 or 69, respectively, of the receiver and by way of the time-delay relay 63 to the igniters of the explosive charges 46.

A further embodiment of the invention is illustrated in FIGURE 8 and includes a cutting device 86 for the tow line 2, which cutting device is coordinated to the releasing mechanism 7 and the locking device 10. The cutting device 86 is constructed so as to be actuated by means of the releasing mechanism 7. Such a cutting device 86 prevents the tow line from winding or twisting about the towed aircraft 1, for example if severed by a projectile during the target firing operation, which will be the case if the line is not separated directly at the towed aircraft 1 but, instead, if a longer portion of the tow line remains attached to the towed aircraft.

The tow line cutting device 86 is positioned about the tow line 2 forward of the releasing mechanism 7 and includes a housing 87 having a bore 88 therein for the free passage of the tow line 2. The bore 88 intersects a continuous bore 89 which receives a piston 90, used as a knife, and an explosive charge 91 having an appropriate igniter. The space or chamber containing the explosive charge 91 is sealed off by means of a closure cap 92 so that the explosive action of the explosive charge 91 acts upon the free end of the piston 90. The explosive charge 91 and the igniter therefor is connected, by means of electric cables, to the current supply with interposition of the delay member 63 shown in FIGURE 7.

At the beginning of the recovery operation, the explosive charge 91 is ignited and the piston 90 is forced against the tow line 2 in the bore 88 with the result that the tow line is severed. The severing or cutting step may be effected either simultaneously with or a short time prior to the beginning of the recovery operation. In the position of rest thereof, the piston 90 is retained by means of a spring-loaded detent 93 which engages in an annular groove 94 in the piston 90 and, during actuation of the latter, the detent is forced back into the housing wall against the action of the spring. A guide sleeve or bushing 95, having a bore 96 therein for guiding the tow line 2, may be provided at the nose of the towed aircraft. By means of the cutting or severing device 86, the tow line 2 is separated directly at the towed aircraft whereby any twisting or winding of the tow line around the towed aircraft and the recovery means therefor during disengagement of the tow line is effectively prevented.

The present invention is not limited to the embodiment specifically shown and described herein but a number of other constructions also are feasible. In place of the recovery parachute, it is possible to effect, by means of the releasing mechanisms described above, the extension of flexible wing surfaces, of known construction, mounted in the towed aircraft and by means of which the towed aircraft 1 may gently descend to the ground.

It will be obvious to those skilled in the art that many modifications may be made within the scope of the present invention without departing from the spirit thereof, and the invention includes all such modifications.

What is claimed is:

1. A recovery system for aircraft towed by a tow line which comprises a towed aircraft, recovery means in said aircraft, locking means for securing the recovery means against release, an electrical system for controlling operation of said locking means, said electrical system including a control switch, releasing means for automatically operating said control switch and said locking means to release said recovery means upon decrease in tension in an associated tow line, said releasing means including a setting means for connection to a tow line and mounted for movement in an axial direction with respect to said towed aircraft, and resilient means normally biasing said setting means in a direction opposite to the direction in which the setting means is biased by an associated tow line when under tension, said setting means being operatively associated with said switch to control the operation of the switch and said locking means.

2. Apparatus as defined in claim 1 wherein said electrical system includes time-delay means for transmitting electrical impulses with a time delay from said switch means to said locking means.

3. Apparatus as defined in claim 1 wherein said locking means includes explosive means.

4. Apparatus as defined in claim 1 wherein said recovery means comprises a parachute, said towed aircraft including a chamber containing said parachute, a closure means for said chamber, said locking means serving to lock said closure means in operative position.

5. Apparatus as defined in claim 1 wherein said locking means includes a movably mounted locking lever, and explosively actuated bolt means for actuating said locking lever.

6. Apparatus as defined in claim 1 wherein said electrical system includes additional switch means operable to open an electric circuit in said towed aircraft while the towed aircraft is mounted on a towing aircraft.

7. Apparatus as defined in claim 1 wherein said electrical system includes electrical signal receiving means connected in said electrical system whereby said locking means may be actuated independently of said releasing means by signals from a transmitter.

8. Apparatus as defined in claim 1 including means for cutting an associated tow line.

References Cited

UNITED STATES PATENTS

| | | | |
|---|---|---|---|
| 2,257,277 | 9/1941 | Righter et al. | 244—139 |
| 2,460,194 | 1/1949 | Schultz | 244—3 X |
| 2,560,445 | 7/1951 | Jackson | 244—138 |
| 2,898,058 | 8/1959 | Del Mar | 244—3 |
| 3,015,463 | 1/1962 | Gross | 244—147 |
| 3,057,652 | 10/1962 | Geffner et al. | 244—150 |
| 3,362,664 | 1/1968 | McElroy | 244—152 |

MILTON BUCHLER, *Primary Examiner.*

J. L. FORMAN, *Assistant Examiner.*

U.S. Cl. X.R.

244—139, 147